(12) United States Patent
Bosman et al.

(10) Patent No.: US 8,297,841 B2
(45) Date of Patent: Oct. 30, 2012

(54) TUBULAR PACKAGE

(75) Inventors: Brent Bosman, Florence, SC (US); Scott Huffer, Hartsville, SC (US)

(73) Assignee: Sonoco Development, Inc., Hartsville, SC (US)

( * ) Notice: Subject to any disclaimer, the term of this patent is extended or adjusted under 35 U.S.C. 154(b) by 299 days.

(21) Appl. No.: 12/701,143

(22) Filed: Feb. 5, 2010

(65) Prior Publication Data

US 2011/0195209 A1      Aug. 11, 2011

(51) Int. Cl.
B65D 33/00 (2006.01)
B65D 30/08 (2006.01)
B65D 65/26 (2006.01)
B31B 1/64 (2006.01)

(52) U.S. Cl. ............... 383/207; 383/210.1; 383/211; 383/111; 229/87.05; 493/194

(58) Field of Classification Search ............ 383/111, 383/207–211, 203, 204, 61.1; 229/87.05; 493/194
See application file for complete search history.

(56) References Cited

U.S. PATENT DOCUMENTS

| | | | |
|---|---|---|---|
| 1,641,408 A | 9/1927 | Bainbridge et al. | |
| 2,611,483 A | 9/1952 | Adams | |
| 2,811,455 A | 10/1957 | Erekson | |
| 2,815,212 A | 9/1958 | Parmer | |
| 3,038,651 A * | 6/1962 | Cloudsley | 383/208 |
| 3,092,252 A * | 6/1963 | Brause et al. | 600/549 |
| 3,189,174 A * | 6/1965 | Cormack | 206/63.3 |
| 3,301,392 A * | 1/1967 | Regan, Jr. | 206/363 |
| 3,474,789 A * | 10/1969 | Soto | 604/408 |
| 3,535,409 A | 10/1970 | Rohde | |
| 3,917,160 A * | 11/1975 | Olerud | 383/93 |
| 4,108,309 A * | 8/1978 | Bronner | 206/528 |
| 4,411,358 A * | 10/1983 | Bennwik et al. | 206/771 |
| 4,648,509 A | 3/1987 | Alves | |
| 5,371,997 A | 12/1994 | Kopp et al. | |
| 5,411,202 A | 5/1995 | Fenini | |
| 5,511,664 A | 4/1996 | Aramaki et al. | |
| 6,352,364 B1 | 3/2002 | Möbs | |
| 6,391,353 B1 | 5/2002 | Marbler et al. | |
| 6,746,743 B2 | 6/2004 | Knoerzer et al. | |
| 6,910,995 B2 | 6/2005 | Schneider et al. | |
| 7,032,810 B2 | 4/2006 | Benedetti et al. | |
| 7,419,301 B2 | 9/2008 | Schneider et al. | |
| 7,470,062 B2 | 12/2008 | Moteki et al. | |
| 2003/0152300 A1 | 8/2003 | Tu et al. | |

(Continued)

FOREIGN PATENT DOCUMENTS

WO          WO 02/28724 A3      4/2002

Primary Examiner — Jes F Pascua
(74) Attorney, Agent, or Firm — Flaster/Greenberg, P.C.

(57) ABSTRACT

A flexible package is defined by an inner package layer and a surrounding outer package layer. The inner and outer layers define a tubular body and opposing end portions. A first region of weakness is provided within the outer package layer and is spaced from one end of the package. The region of weakness within the outer packaging layer forms an opening mechanism for the outer layer to expose the inner packaging layer. A second region of weakness is provided within the inner package layer and is spaced from the end of the inner package. The second region of weakness positioned offset from the first region of weakness, to permit the two opening mechanism to be separately activated.

22 Claims, 6 Drawing Sheets

U.S. PATENT DOCUMENTS

| | | |
|---|---|---|
| 2004/0022462 A1 | 2/2004 | Markham |
| 2005/0078890 A1 | 4/2005 | Abe et al. |
| 2006/0071057 A1* | 4/2006 | Aschenbrenner et al. . 229/87.05 |
| 2006/0188182 A1 | 8/2006 | Moteki et al. |
| 2007/0237434 A1 | 10/2007 | McKeller |
| 2008/0038415 A1 | 2/2008 | Obermann |
| 2008/0170814 A1 | 7/2008 | Bowers et al. |
| 2009/0190866 A1 | 7/2009 | Hughes |

* cited by examiner

FIG. 10 ized from the end of the inner package. The second region
of weakness is preferably positioned offset from the first
region of weakness to permit the two opening mechanism to
be separately activated. A pattern adhesive is provided for
securing the inner packaging layer within the outer packaging
layer. The adhesive pattern includes a releasable adhesive
portion that is contiguous with the first region of weakness.
The first region of weakness and the releasable adhesive
portion form an opening mechanism for separating the outer
package layer from the package and to expose the inner
package layer and the second region of weakness. The second
region of weakness forms an opening mechanism for the
inner packaging layer that is separately activated from the
opening mechanism of the first region of weakness in the
outer packaging layer.

TUBULAR PACKAGE

TECHNICAL FIELD

The present disclosure relates to packaging formed from a flexible laminate material. More specifically, the present disclosure relates to providing a sealed package with an opening mechanism formed within the laminate material.

BACKGROUND

The use of flexible packaging for storing and shipping food and other products is common. It is also known to provide opening mechanisms for controlled access to the contents of the package. The packaging materials may take many forms and may include multiple layers. It is also known to provide separate opening mechanisms for the individual layers within a package.

U.S. Pat. No. 1,641,408 to Bainbridge et al. shows a package having a secondary cover provided at one end and a sealing means to secure the cover to the end of the package. The cover portion wraps around the package and includes a perforation line within a folded extension of the cover. A metal clip is secured to the end of the package to retain the cover. Removal of the clip exposes the cover, which may be separated from the package by tearing along the perforation line.

U.S. Pat. No. 6,391,353 to Marbler et al. shows a multilayer package having a score line formed in the outer layer of the package and a separate score line formed on the inside layer of the package. Removal of a portion of the outside layer along the outside score line creates a hood or cap structure. The inside layer and the outside layer are attached at the end seal. Removal of the cap structure causes separation of an end portion of the inner layer along the inside score line.

U.S. Pat. No. 2,811,455 to Erekson shows a package having an inner container, including a separating score line, and an outer wrapper. A removal tape is provided under the outer wrapper, which overlaps the inner score line. An exposed end of the tape forms a starting tab to create a separation line through the outside layer. The separation of the outer wrapper exposes the inner score line for further separation of the top portion of the package.

US 2004/0022462 to Markham shows a multilayer package having opening mechanisms within various layers. The package includes a closed end in which both layers are secured together. A line of weakness may be formed in the outer layer, spaced from the closed end as well as within the inner layer. The line of weakness is spaced from an inner seal within the inner package. Additional lines of weakness are provided in the outer package layer and inner layer. Opening of the package is accomplished by tearing across the line of weakness, opening the outer package and exposing the inner package.

SUMMARY

The present invention is contemplated to take the form of a flexible package having an inner package layer and an outer package layer, which surrounds the inner package layer. Preferably, the inner and outer packaging layers define a tubular body having opposing sealed end portions. A first region of weakness is provided within the outer package layer and is spaced from one end of the outer layer. The region of weakness within the outer layer forms an opening mechanism for the outer layer to expose the inner packaging layer. A second region of weakness is provided within the inner layer and is In one aspect of the invention, the first line of weakness includes parallel separation lines extending transversely across the package to define a separable strip portion within the outer layer. A release tab may be further defined within the strip portion, for start-up of the removal of the strip along the line of weakness.

In another aspect of the invention, the first line of weakness includes a single score line provided in the outer layer. The score line extends around the circumference of the package and defines a removable end cap portion. In removing the cap portion formed by the outer layer, the end of the inner layer is exposed along with the second line of weakness for separate opening of the inner layer.

In a further aspect of the invention, the second line of weakness is formed within a fin seal extension along one side edge of the inner layer. The seal extension may be formed prior to the provision of the outer layer or as part of the laminate assembly. In one form, the fin seal extension is provided with a side slit provided on the edge of the side seal area. The side slit forms a tearing start for the package layer, while the surrounding seal maintains the integrity of the package layer. The end seal and extension may be formed by a pattern adhesive or by a combination of heat and pressure.

Further features and advantages of the present invention will become apparent by a review of the description below and a review of the appended drawings.

BRIEF DESCRIPTION OF THE DRAWINGS

For the purpose of illustrating the invention, the drawings show forms that are presently preferred. It should be understood that the invention is not limited to the precise arrangement and instrumentality shown in the drawings.

DETAILED DESCRIPTION

Figure 1:
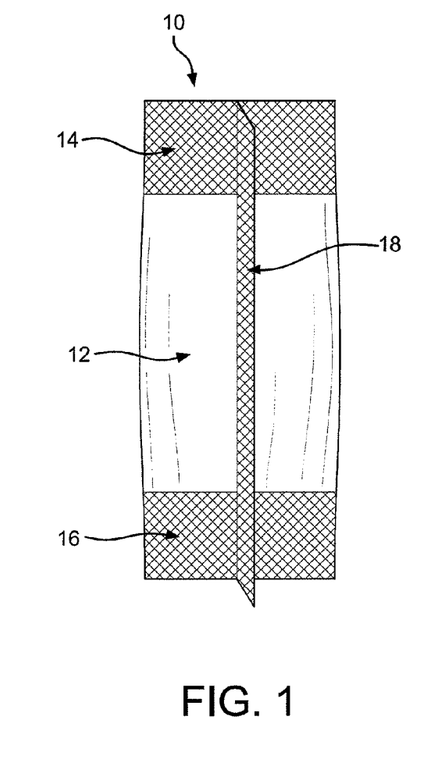
FIG. 1 is an elevational view of a tubular package formed from a flexible material as contemplated by the present invention.

Referring to the figures, wherein like numerals are used to identify like elements throughout, there is shown embodiments of a flexible package which is generally designated by reference numeral 10. The package 10 in FIG. 1 is in the form of a hollow tube with sealed ends and having a generally rectangular construction, but may have any desired shape. The package 10 includes a generally elongated body 12 with two end seals 14, 16 and a side fin seal 18. The package 10 is of the type that is from a web material and formed in a form, fill and seal machine on a continuous basis. The seals 14, 16, 18 may be created by the combination of heat and pressure, the use of adhesives or any known means. The body portion 12 defines an interior volume for retaining product, such as powder, pellets or other defined items.

Figure 2:
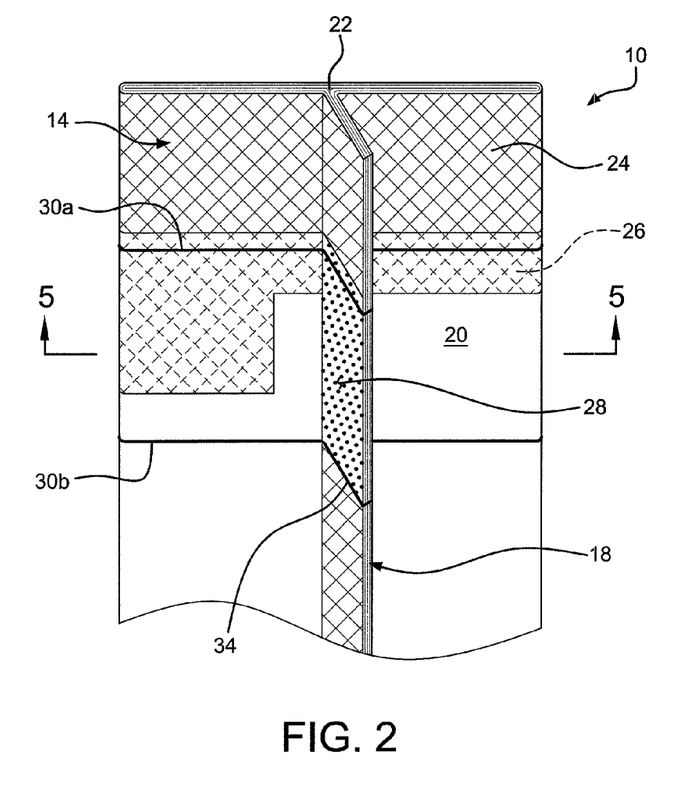
FIG. 2 is an enlarged partial view of one end of a tubular package having the features of the present invention.
Figure 5:
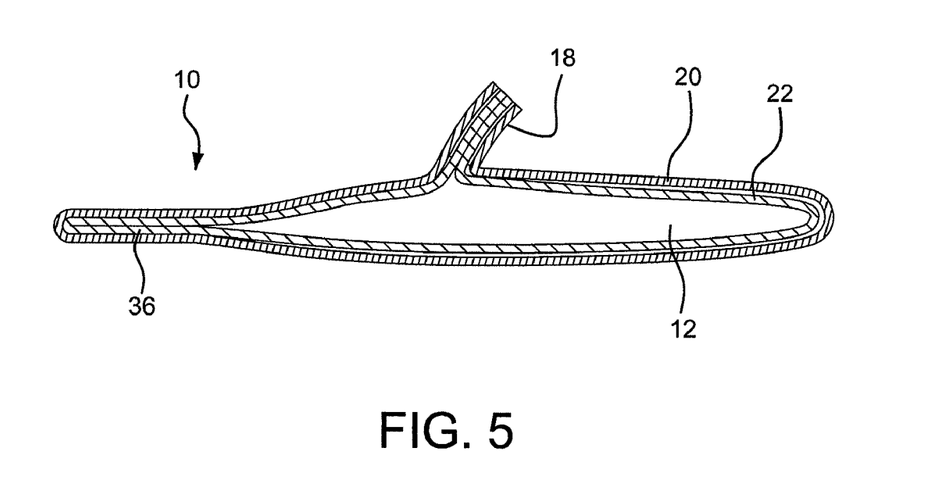
FIG. 5 is a cross sectional view of the package embodiment of FIGS. 2-5, as taken along line 5-5 in FIG. 2.

In FIG. 2, the end seal 14 of the package 10 is shown in an enlarged form so as to illustrate various structural features. The package material includes a laminate having an outer layer 20 formed around an inner layer 22. The laminate layers 20, 22 are more clearly defined in the cross sectional view of FIG. 5. The layers 20, 22 may be adhered to one another by an adhesive or otherwise secured together. The end seal 14 of the package 10 is defined by an end portion 24 and an inner seal 26. As shown, the end portion 24 of end seal 14 is illustrated by crossed hatch lines. The inner seal 26 is illustrated by the broken line cross hatch. A separation portion 28 is provided in the fin seal 18 and is illustrated by a plurality of dots. A line of weakness 30 is defined in the outer layer 20 and extends around the circumference of the package 10 and across the separation portion 28 of the fin seal 18. The formation of the seal and separation portions is discussed in further detail below.

Figure 3:
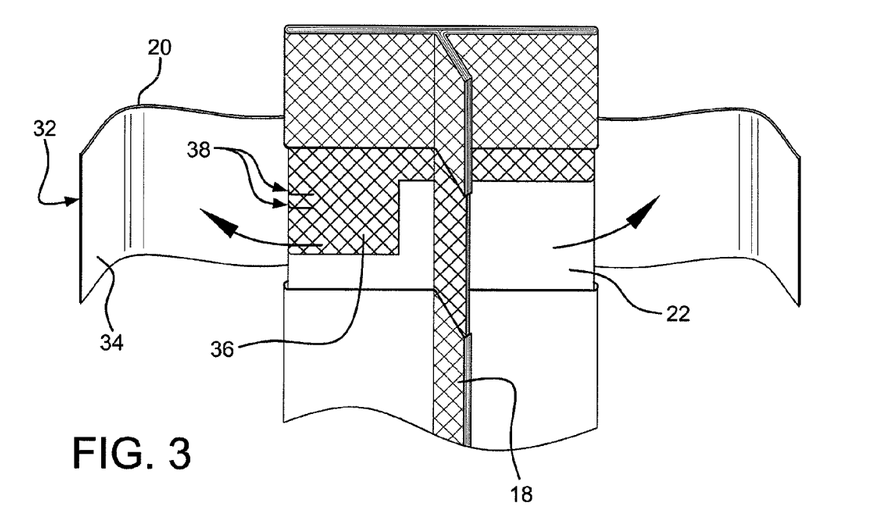
FIG. 3 is a partial view of the end of the package shown in FIG. 2, wherein a portion of the outer layer is partially removed.

The first line of weakness 30 in FIG. 2 is defined by a first line 30a and a second line 30b, which are spaced and extend parallel to one another. The lines 30a, 30b are preferably formed in the outer layer 22 of the laminate material. The lines 30a, 30b may be formed as a straight cut or as a perforation pattern. Preferably, the lines 30a, 30b extend through into the outer laminate 20, but may vary in depth as desired. As shown in FIG. 3, the first line of weakness 30 defines a separable strip portion 32 within the outer layer 20.

A release tab 34 is formed on the fin seal 18, permitting easy separation of the strip 32 from the remainder of the outer layer 20 and from the underlying inner layer 22. Preferably, the strip 32 is secured to the inner layer 22 by a pattern applied releasable adhesive. In the area 28 (dotted) of the release tab 34, no adhesive is preferably applied, or the adhesive is blocked to provide separation of the tab 34 from the portion of the inner layer 20 within the fin seal 18. The tab 34 may also be formed in another area of the outer layer 22 by similar means.

In FIG. 3, the strip 32 is partially separated from the remainder of the outer layer 20 and removed from adherence to the inner layer 22. The separation of the strip 32 is defined along the first line of weakness 30, defined by the parallel lines 30a, 30b. The exposed portion of the inner layer 22 includes a portion of the body 12 of the package 10. A side portion 36 of the inner seal 26 of the inner layer 22, as previously covered by the strip 32, is now exposed (and is shown in full cross hatch). The side portion 36 of the inner seal 26 extends downwardly from the end seal 14 along one side edge of the package 10. The end seal 14 and the side seal portion 36 are contemplated to be formed as a permanent seal of at least one layer of the package, requiring a destructive force in order to separate the sealed areas. The permanent seal may be formed by a pattern applied permanent adhesive or by a localized heat seal. A heat seal is typically formed by a combination of pressure and heat and requires compatible materials for an acceptable bond. The side seal 36 is formed between the inside surfaces of the inner layer (see FIG. 5). In making an appropriate material selection, where the inner layer 22 is not compatible with the material of the outer layer, the heat seal may be applied through the outer layer 20. The bond between the inner and outer layers under the strip is preferably a releasable adhesive, which would not be affected by the applied heat seal forming the side seal portion 36. The remainder of the end seal 14 within the packaging layers may be formed by a permanent adhesive and/or a heat seal.

As discussed, the strip 32 is releaseably bonded to the inner layer 22, while the end seal 14 and the side seal portion 36 take the form of a permanent seal. In addition, the portion of the fin seal 18 formed by the inner layer 22 creates a permanent bond, with the adhesive area 28 between the inner and outer layers 20, 22 in the fin seal 18 being absent or deadened to create the release tab 34.

Figure 4:
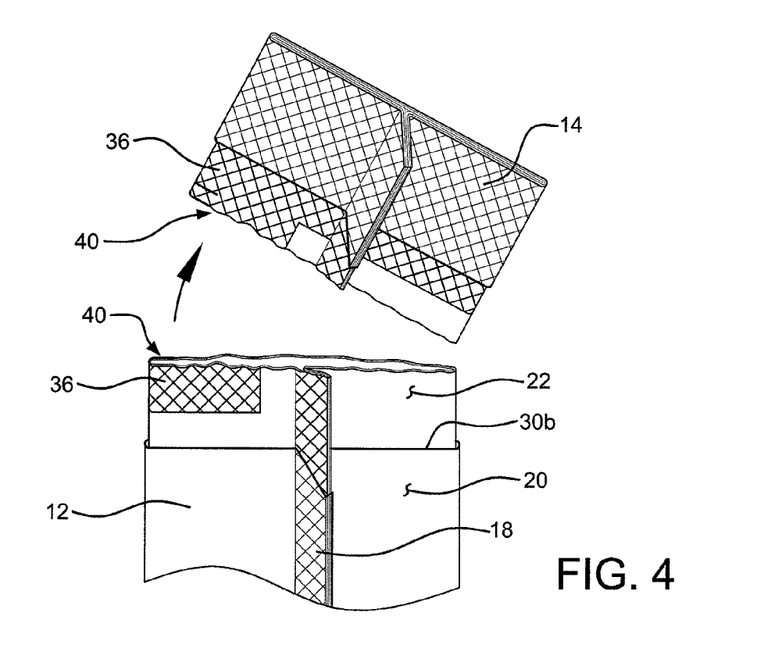
FIG. 4 is a partial view of the end of the package shown in FIGS. 2 and 3, wherein a portion of the inner layer of the package is removed.

The side seal portion 36 in the inner layer 22 includes a line of weakness 38 formed within the sealed area along the edge of the package. As shown the second line of weakness 38 is in the form of two parallel cuts. As shown in FIG. 4, the cuts 38 create a start up location for a tear line 40 within the inner package layer 22, to open the package 10, providing access to the product within the body 12 thereof. Prior to removal of the strip 32, the side portion 36 and the associated line of weakness 38 are covered by the outer layer 20. Upon separation of the strip 32 along the first line of weakness, the opening mechanism for the inner layer 22 is exposed. Thus, the opening mechanism for the inner layer is actuated separately from the opening mechanism for the outer layer 20. Preferably, the line of weakness 30 in the outer layer 20 is offset from the line of weakness 38 in the inner layer 22, such that the two opening mechanisms are activated by separate actions, and the opening of the outer layer does not readily activate the opening of the inner layer.

Figure 6:
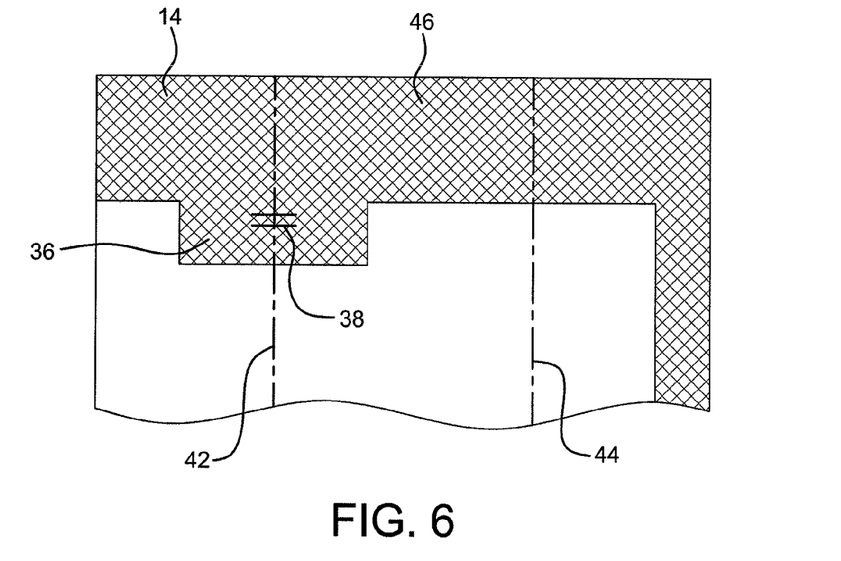
FIG. 6 shows the formation of an inner packaging layer for use in the package of the present invention.
Figure 7:
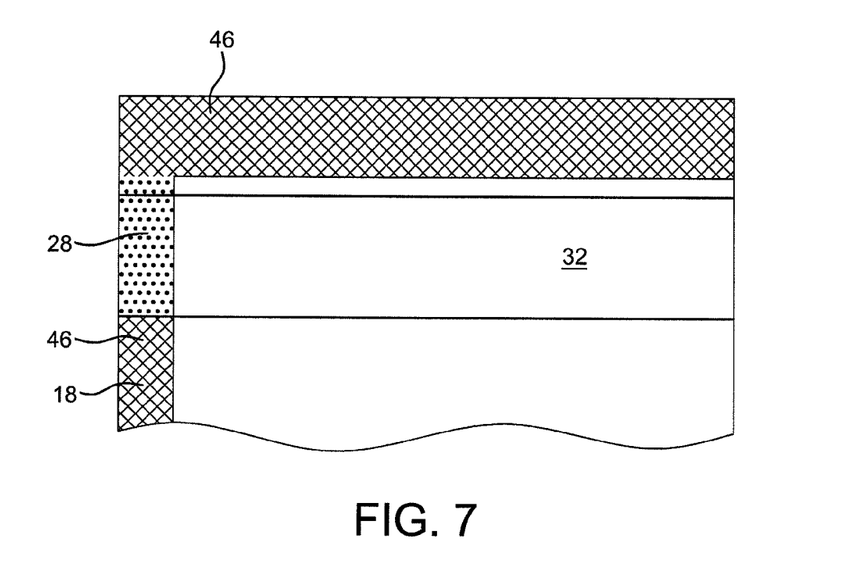
FIG. 7 shows the formation of an outer packaging layer for use in the package of the present invention.

In FIGS. 6 and 7, the laminate layers 20, 22 are shown as separated webs. FIG. 6 shows the end portion of the inner layer 22. The permanent adhesive is shown by cross hatch 46 on the surfaces of the material. The folded edges of the formed package are show by dashed lines 42, 44 extending the length of the web. An extension of the adhesive 46 forms the side seal portion 36, along the side edge represented by dashed hatch lines 42. Within the side portion 36 is provided cuts that form the line of weakness 38.

In FIG. 7, the outer layer 20 of the laminate is shown. A cross-hatched permanent adhesive 46 is applied along the top edge of end 14 and along a portion of the side edge that forms the fin seal 18. The adhesive is deadened in the area 28 of the fin seal 18, where the separation of the strip 32 is to be started by tab 34. This release tab 34 may be formed on both sides of the fin seal by a similar deadened area on the opposite side edge of the web. A non-permanent adhesive may be pattern applied in the area of the strip for releasable adhesion of the material to the inner layer 20. The additional adhesion of the non-permanent or releasable adhesive may add to the integrity of the package in the area, where the strip is defined by score lines extending into the outer layer material.

Figure 8:
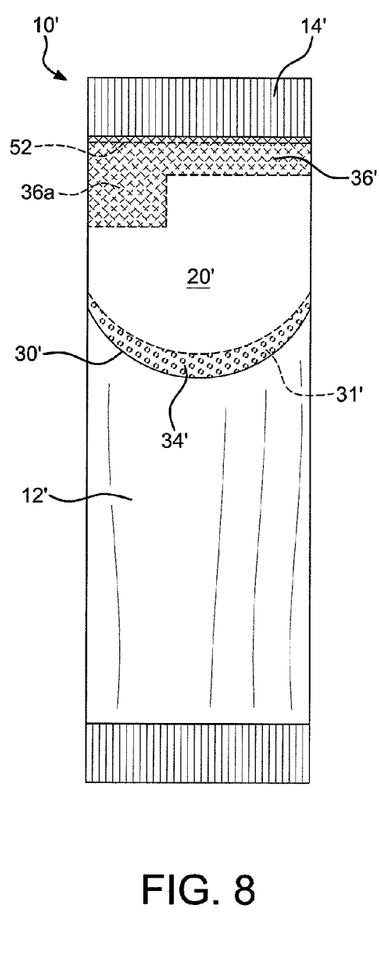
FIG. 8 is a front elevational view of an alternate form of a package having the features of the present invention therein.
Figure 9:
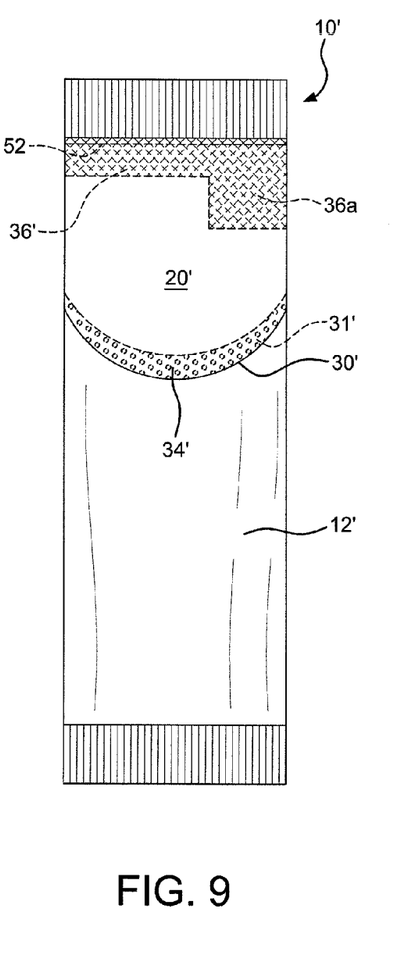
FIG. 9 is a rear elevational view of the package embodiment shown in FIG. 8.
Figure 10:
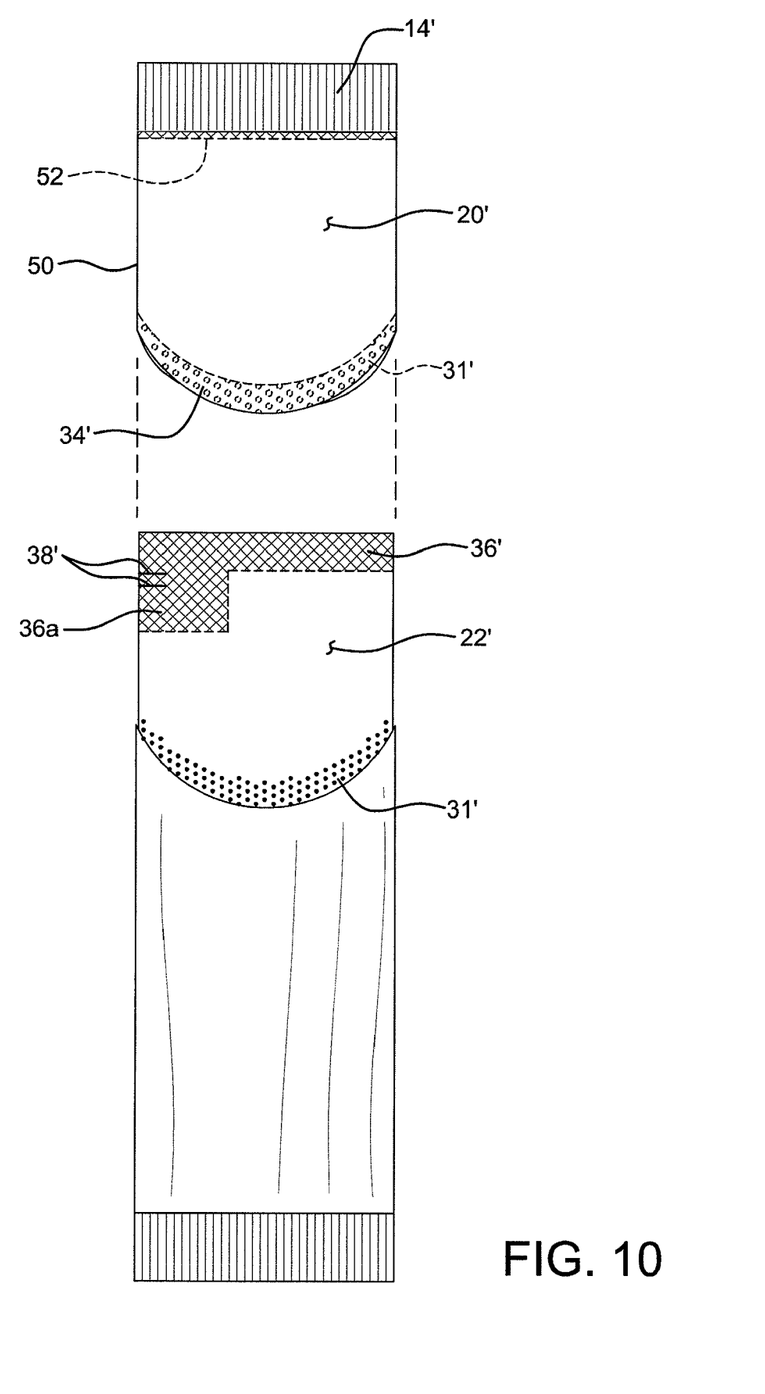
FIG. 10 shows the package of FIGS. 8 and 9, wherein a portion of the outer layer is being removed to expose the inner packaging layer.

In the embodiment of the package 10' shown in FIGS. 8-10, the body 12' is defined by a laminate material having layers 20' and 22'. In FIGS. 8 and 9, the end seal 14' is formed by both the inner and outer layers 20', 22' of the laminate. A curved first line of weakness 30' is formed in the outer layer 20' and extends across the front and back of the package 10' (FIGS. 8 and 9, respectively). A releasable adhesive may be provided under the end portion of the outer layer, above the first line of weakness 30', as shown by the dotted area 31'. The combination of the curved line 30' and release between the two layers creates a separation or release tab 34' in the outer layer 20'. An adhesive void may be provided above the releasable adhesive 31' (below the permanent end seal 14') for easy separation of the top portion of the outside layer 20'. Alternatively, the area 31' adjacent the line of weakness 30' may include an adhesive void, with the area above (and below the end seal 14') having a relatively low adhesion.

As shown in FIG. 10, the first line of weakness 30' creates a separation point for a defined cap portion 50 formed by the outside layer 20' of the package 10'. The cap 50 may include a portion of the sealed end of the inside layer 22'. As such, a separation line 52 is provided in the inside layer 22' for removal of the end of the portion of the inside layer included in the end seal 14'. The end of the of inside layer 22' remains sealed after removal of the cap 50 by positioning the separation line 52 within the seal extension 36'. The seal extension 36' as illustrated, extends across the width of the package 10' within the inside layer 22'. The seal extension also includes a side seal portion 36a. A second line of weakness 38' is formed in the side seal extension 36a for opening the seal 36' of the inside layer 22, similar to that provided in the embodiment of FIGS. 2-7.

In the embodiment of FIGS. 8-10, the end seal 14' may be formed by a permanent adhesive, a heat seal or the like. In the preferred structure, it is contemplated that the layers will be at least partially adhered to one another. Thus, normally the space between the layers would be filled with an adhesive, except for the strategic removal of adhesion within the releasing portions. In the package 10' in FIGS. 8-10, a releasable adhesive is also contemplated to be provided in the fin seal area (not shown). Thus, the cap portion 50 of the outer layer 20' separates from the body of the inner layer 22' and peels away from the fin seal (above the first line of weakness 30', which preferably extends around the package similar to line 30b in FIGS. 2-7).

In the illustrated embodiments of the package, the layers include separate opening mechanisms, which are separately activated. The first line of weakness, preferably in conjunction with a patterned adhesive, forms an opening mechanism for the outer layer. Once the outside layer is opened, the inside layer is exposed, along with its separate opening mechanism. The second line of weakness provides for opening of the inside layer and access to the contents of the package. The form of the two opening mechanisms as illustrated are different and are offset within the package. This variation in form, position and the selective adhesive pattern create the separate activation.

It is contemplated that the separate activation of the two opening mechanisms for the two package layers creates a tamper evident structure. In addition the separate forms of the opening mechanisms, coupled with the separate activation, serve to deter opening by small children. Even if one layer is opened, the inner layer maintains the integrity of the seal, until such time that the second opening mechanism is figured out and activated. Control of the ease of opening of the package layers may be controlled by the selection of the form of the opening mechanisms, the materials within the package layers and the adhesive pattern between the layers.

In a preferred embodiment, the package may be formed by an outer layer of polyethylene terephthalate (PET) and an inner layer formed by metallized oriented polypropylene with a sealing layer of low-density polyethylene (LDPE). A pattern adhesive of any desired form is preferably provided between the PET and oriented polypropylene layers in the manner described.

Although the invention has been described and illustrated with respect to the exemplary embodiments thereof, it should be understood by those skilled in the art that the foregoing and various other changes, omissions and additions may be made therein and thereto, without parting from the spirit and scope of the present invention. Accordingly, reference should be made to the appended claims, rather than to the foregoing specification, as indicating the scope of the invention.

What is claimed is:

1. A flexible package comprising:
   an inner tubular package having sealed end portions,
   an outer tubular package portion surrounding the inner package and having sealed end portions, the sealed end portions of the inner package positioned adjacent the end portions of the outer package, the outer package adhesively secured to the inner package by a patterned adhesive,
   a first region of weakness within the outer package spaced from one end of the outer package, the first region of weakness forming an opening mechanism for the outer package,
   a second region of weakness within the inner package spaced from the end of the inner package, the second region of weakness within the inner package positioned offset from the first region of weakness within the outer package,
   the first region of weakness forming an opening mechanism for the outer package for removal of a opening portion of the outer package and to expose a portion of the inner package having the second region of weakness, the patterned adhesive formed for release of the opening portion of the outer package from the exposed portion of the inner package, and
   the second region of weakness forming an opening mechanism separately activated from the opening mechanism of the first region of weakness.

2. A flexible package as claimed in claim 1 wherein the inner and outer packages are formed from plastic material.

3. A flexible package as claimed in claim 1 wherein the opening mechanism in the outer package defines a removable protective cover for the inner package.

4. A flexible package as claimed in claim 1 wherein the first region of weakness extends across the width of the outer package.

5. A flexible package as claimed in claim 1 wherein the first region of weakness is formed in part by a perforation line within the wall of the outer package.

6. A flexible package as claimed in claim 1 wherein the second region of weakness within the inner package is formed in a sealed side edge for the inner package.

7. A flexible package as claimed in claim 1 wherein the first region of weakness runs around the circumference of the tube of the outer package.

8. A flexible package as claimed in claim 1 wherein the inner and outer packages are connected together at one or more points along at least one side edge of the flexible package.

9. A flexible package as claimed in claim 1 wherein the inner package comprises a heat sealed portion surrounding the second opening mechanism in the inner package, the heat sealed portion of the inner package releaseably secured to the outer package by the adhesive pattern.

10. A flexible package as claimed in claim 1 wherein the pattern adhesive comprises a pressure sensitive adhesive for securing the outer package to the inner package in the area of the first region of weakness of the outer package.

11. A flexible package as claimed in claim 10 wherein the sealed end portions of the inner package are heat sealed to define a closed volume within the inner package.

12. A flexible package as claimed in claim 11 wherein the sealed end portions of the outer package are adhesively secured to the sealed end portions of the inner package.

13. A flexible package as claimed in claim 1 wherein the inner package and the outer package are formed together as a laminate material.

14. A flexible package as claimed in claim 13 wherein the patterned adhesive comprises a releaseable adhesive portion and permanent adhesive portion for securing the laminate material forming the inner package and the outer package.

15. A flexible package comprising:
an inner tubular package having sealed end portions,
an outer tubular package portion surrounding the inner package and having sealed end portions, the sealed end portions of the inner package positioned adjacent the end portions of the outer package,
a first region of weakness within the outer package spaced from one end of the outer package, the first region of weakness forming an opening mechanism for the outer package,
a second region of weakness within the inner package spaced from the end of the inner package, the second region of weakness within the inner package positioned offset from the first region of weakness within the outer package,
wherein opening the outer package by the first region of weakness exposes the inner package and the second region of weakness, and
wherein the opening mechanism of the second region of weakness is separately activated from the opening mechanism of the first region of weakness,
the inner and outer packages connected together at one or more points along at least one side edge of the flexible package, the connection between the inner and outer packages made by an adhesive.

16. A flexible package comprising:
an inner tubular package having sealed end portions,
an outer tubular package portion surrounding the inner package and having sealed end portions, the sealed end portions of the inner package positioned adjacent the end portions of the outer package,
a first region of weakness within the outer package spaced from one end of the outer package, the first region of weakness forming an opening mechanism for the outer package,
a second region of weakness within the inner package spaced from the end of the inner package, the second region of weakness within the inner package positioned offset from the first region of weakness within the outer package,
wherein opening the outer package by the first region of weakness exposes the inner package and the second region of weakness, and
wherein the opening mechanism of the second region of weakness is separately activated from the opening mechanism of the first region of weakness,
the inner and outer packages are connected together at one or more points along at least one side edge of the flexible package, the connection between the inner and outer packages made in a region between one of the connection points and the first line of weakness in the outer package.

17. A flexible package comprising:
an inner layer, and
an outer layer,
the outer layer having an outer layer opening mechanism, and
the inner layer having a separate inner layer opening mechanism, the inner layer opening mechanism positioned offset from the outer layer opening mechanism,
the outer layer opening mechanism forming an end cap and defining a removable portion of the outer layer covering an end portion of the inner layer,
an adhesive pattern releasably attaching the inner and outer layers adjacent the offset opening mechanisms, and
the inner layer having a heat sealed portion surrounding the inner layer opening mechanism, the heat sealed portion of the inner layer releaseably secured to the outer layer by the adhesive pattern.

18. A flexible package comprising:
an inner package layer having a tubular body and opposing end portions,
an outer package layer formed around the inner package layer, the outer packaging layer having an end portion,
a first region of weakness provided within the outer package layer and spaced from the end portion of the outer package layer, the region of weakness forming an opening mechanism for the outer package layer,
a second region of weakness provided within the inner package layer, the second region of weakness spaced from the end portion within the inner package layer and offset from the first region of weakness, and
a pattern adhesive securing the inner packaging layer within the outer packaging layer, the pattern adhesive having a releasable adhesive portion contiguous with the first region of weakness,
wherein the first region of weakness and the releasable adhesive portion forms an opening mechanism for the outer package layer to expose the inner package layer and the second region of weakness, and
wherein the second region of weakness forms a second opening mechanism for the inner packaging layer, the second opening mechanism separately activated from the opening mechanism of the first region of weakness in the outer packaging layer.

19. A method of manufacturing a multi-layered flexible package comprising the steps of:
(i) providing an inner tubular layer,
(ii) forming a region of weakness in the inner tubular layer,
(iii) forming an outer tubular layer around the inner tubular layer,
(iv) forming a region of weakness in the outer layer, and positioning the region of weakness in the outer tubular layer adjacent to but offset from the region of weakness formed in the inner tubular layer,
(v) releaseably securing the outer tubular layer to the inner tubular layer in the area of the region of weakness of the outer tubular layer,
(vi) sealing the ends of the inner tubular layer to define a closed volume within the inner tubular layer,
(vii) sealing the ends of the outer tubular layer, at least one sealed end of the outer tubular layer releasably secured to the inner tubular layer, the releasably secured end of the outer tubular layer being separable from the outer tubular layer along the region of weakness in the outer tubular layer for exposing the offset region of weakness in the inner tubular layer and one of the sealed ends of the inner tubular layer.

20. A method of manufacturing a multi-layered package as in claim 19 wherein the outer layer is initially formed from a sheet of material, the sheet being perforated along its width to form the region of weakness in the outer layer.

21. A method of manufacturing a multi-layered flexible package as in claim 20 wherein said sheet material used to form the outer layer is folded and sealed to itself to form the first tubular layer.

22. A method of manufacturing a multi-layered flexible package comprising the steps of:
   (i) providing an inner tubular layer,
   (ii) forming a region of weakness in the inner tubular layer,
   (iii) forming an outer tubular layer around the inner tubular layer,
   (iv) forming a region of weakness in the outer layer, adjacent to but offset from the region of weakness formed in the inner layer,
   (v) releaseably securing the outer tubular layer to the inner tubular layer in the area of the region of weakness of the outer tubular layer, and
   (vi) heat sealing the ends of the inner and outer layers to define a closed volume within the inner tubular layer, wherein the heat sealing of the ends of the layers is performed across the width of the combined inner and outer layers and forms at least one end seal within the outer layer and further forms a separate seal within the inner layer.

* * * * *